United States Patent
Ikenoue

(10) Patent No.: US 11,887,281 B2
(45) Date of Patent: Jan. 30, 2024

(54) INFORMATION PROCESSING DEVICE, HEAD-MOUNTED DISPLAY, AND IMAGE DISPLAYING METHOD

(71) Applicant: SONY INTERACTIVE ENTERTAINMENT INC., Tokyo (JP)

(72) Inventor: Shoichi Ikenoue, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 27 days.

(21) Appl. No.: 17/763,522

(22) PCT Filed: Sep. 24, 2020

(86) PCT No.: PCT/JP2020/036082
§ 371 (c)(1),
(2) Date: Mar. 24, 2022

(87) PCT Pub. No.: WO2021/079680
PCT Pub. Date: Apr. 29, 2021

(65) Prior Publication Data
US 2022/0277425 A1    Sep. 1, 2022

(30) Foreign Application Priority Data
Oct. 25, 2019  (JP) .................................. 2019-194525

(51) Int. Cl.
*G06T 5/00* (2006.01)
*G06F 3/01* (2006.01)
*G06F 3/14* (2006.01)

(52) U.S. Cl.
CPC .............. *G06T 5/002* (2013.01); *G06F 3/011* (2013.01); *G06F 3/016* (2013.01); *G06F 3/14* (2013.01)

(58) Field of Classification Search
CPC .......... G06T 5/002; G06F 3/011; G06F 3/016; G06F 3/14; G06F 3/012; G06F 3/147;
(Continued)

(56) References Cited

U.S. PATENT DOCUMENTS 10,102,666 B2 * 10/2018 Parker .................. G02B 27/017
10,684,469 B2 *  6/2020 Smith .................... G09G 5/363
(Continued)

FOREIGN PATENT DOCUMENTS

JP       H0981308 A    3/1997
JP    2000210468 A    8/2000
(Continued)

OTHER PUBLICATIONS

International Search Report and Written Opinion dated Dec. 8, 2020, from PCT/JP2020/036082, 9 sheets.
(Continued)

*Primary Examiner* — Grant Sitta
(74) *Attorney, Agent, or Firm* — XSENSUS LLP

(57) ABSTRACT

A vibration generation device 112 is provided in a head-mounted display, and as a result of processing by a content processing unit 72, a vibration controlling unit 80 causes the vibration generation device 112 to vibrate so as to correspond to display contents. A drawing unit 86 of a display image generation unit 74 acquires a measurement value of a motion sensor 64 from a measurement value acquisition unit 82 and draws an image in a field of view corresponding to the position and the posture of the user head. During a period during which the vibration generation device 112 vibrates, a vibration correction unit 88 corrects the measurement value in response to the vibration.

14 Claims, 6 Drawing Sheets

(58) Field of Classification Search
CPC ............ G02B 2027/014; G02B 27/017; G02B 27/646; G09G 5/003; G09G 2320/0261; H04N 5/64

See application file for complete search history.

(56) References Cited

U.S. PATENT DOCUMENTS

| | | |
|---|---|---|
| 2014/0232637 A1 | 8/2014 | Park et al. |
| 2015/0293592 A1* | 10/2015 | Cheong .................. G06F 1/163 |
| | | 345/173 |
| 2016/0027414 A1 | 1/2016 | Osterhout et al. |
| 2016/0129346 A1 | 5/2016 | Mikhailov et al. |
| 2018/0181201 A1* | 6/2018 | Grant ...................... G06F 3/012 |
| 2018/0203510 A1* | 7/2018 | Yamano ................ A63F 13/215 |
| 2018/0267616 A1 | 9/2018 | Yamano et al. |
| 2019/0064924 A1* | 2/2019 | Nocon .................... G06F 3/147 |
| 2019/0080505 A1* | 3/2019 | Yeung .................. G06T 15/205 |
| 2019/0155389 A1 | 5/2019 | Lee et al. |
| 2019/0272034 A1 | 9/2019 | Pan |
| 2019/0333480 A1* | 10/2019 | Lang ....................... G06F 3/011 |
| 2020/0051528 A1* | 2/2020 | Huang .................... G06F 3/013 |
| 2020/0132996 A1* | 4/2020 | Yokota .................... G06F 3/013 |
| 2020/0192479 A1* | 6/2020 | Forest .................... G06F 3/016 |

FOREIGN PATENT DOCUMENTS

| | | |
|---|---|---|
| JP | 2013258614 A | 12/2013 |
| JP | 2016527601 A | 9/2016 |
| WO | 2019/026765 A1 | 2/2019 |

OTHER PUBLICATIONS

Extended European search report dated Sep. 29, 2023, in corresponding European patent Application No. 20880007.8, 10 pages.
Office Action dated Oct. 17, 2023, in corresponding Japanese patent Application No. 2019-194525, 6 pages.

* cited by examiner

FIG.6
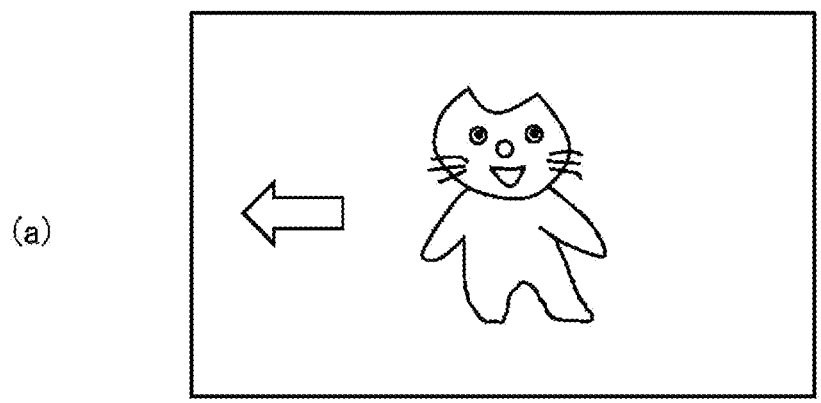
(a)
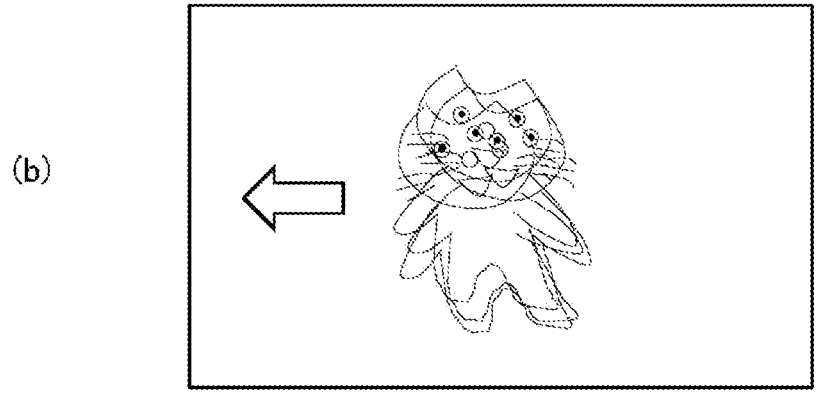
(b)
FIG.7
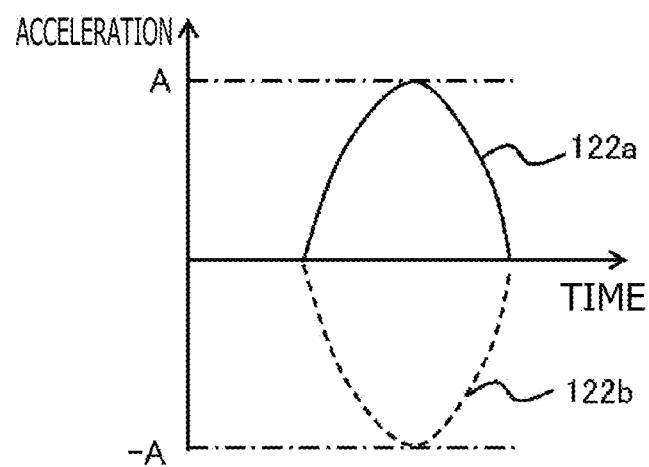

INFORMATION PROCESSING DEVICE, HEAD-MOUNTED DISPLAY, AND IMAGE DISPLAYING METHOD

TECHNICAL FIELD

The present invention relates to an information processing device that causes a head-mounted display to display an image, the head-mounted display, and an image displaying method.

BACKGROUND ART

A system has been popularized which detects a movement of the head of a user on which a head-mounted display is mounted and represents a space of a display target in a corresponding field of view such that an image world that provides realistic sensations can be represented. Further, a walk-through system has been developed by which, when a user who wears a head-mounted display physically moves, the user can virtually walk around in a space displayed as a video.

SUMMARY

Technical Problems

In such a technology as described above, a high-level following-up performance is demanded in a change of the field of view of a display image with respect to a movement of the head of the user. It is considered that even a very small displacement between them not only impairs the realistic sensations to a display world but also impairs physical conditions of the user through visually induced motion sickness. On the other hand, as the range of application of head-mounted displays expands, it becomes demanded to implement a technology that can provide more realistic sensations.

The present invention has been made in such a subject as just described, and it is an object of the present invention to provide a technology that can maintain the quality of a display image on a head-mounted display and can further enhance realistic sensations.

Solution to Problems

An aspect of the present invention relates to an information processing device. The information processing device includes a measurement value acquisition unit that acquires a measurement value by a motion sensor that is built in a head-mounted display, a display image generation unit that generates a display image in a field of view based on the measurement value, a display controlling unit that causes data of the display image to be displayed on a display panel, and a vibration controlling unit that causes a vibration generation device built in the head-mounted display to vibrate so as to correspond to contents of the display image, in which the display image generation unit corrects the measurement value in response to the vibration during a period during which the vibration generation device is caused to vibrate and then determines the field of view.

Another aspect of the present invention relates to a head-mounted display. The head-mounted display includes the information processing device described above, and the motion sensor, the display panel, and the vibration generation device.

A further aspect of the present invention relates to an image displaying method. The image displaying method includes a step of acquiring a measurement value by a motion sensor that is built in a head-mounted display, a step of generating a display image in a field of view based on the measurement value, a step of causing data of the display image to be displayed on a display panel, and a step of causing a vibration generation device built in the head-mounted display to vibrate so as to correspond to contents of the display image, in which the step of generating a display image corrects the measurement value in response to the vibration during a period during which the vibration generation device is caused to vibrate and then determines the field of view.

It is to be noted that a given combination of the components described above and also representations of the present invention where they are obtained by conversion of them between a method, a device, a system, a computer program, a recording medium on which the computer program is recorded, and so forth are effective as modes of the present invention.

Advantageous Effect of Invention

According to the present invention, while the quality of a display image on the head-mounted display is maintained, realistic sensations can be further enhanced.

BRIEF DESCRIPTION OF DRAWINGS

FIG. 6 illustrates views schematically depicting a change of a display image that may be caused by vibration of a vibration generation device in the present embodiment.

FIG. 7 is a view illustrating an example of a technique by which a vibration correction unit in the present embodiment corrects a measurement value of the motion sensor.

DESCRIPTION OF EMBODIMENT

Figure 1:
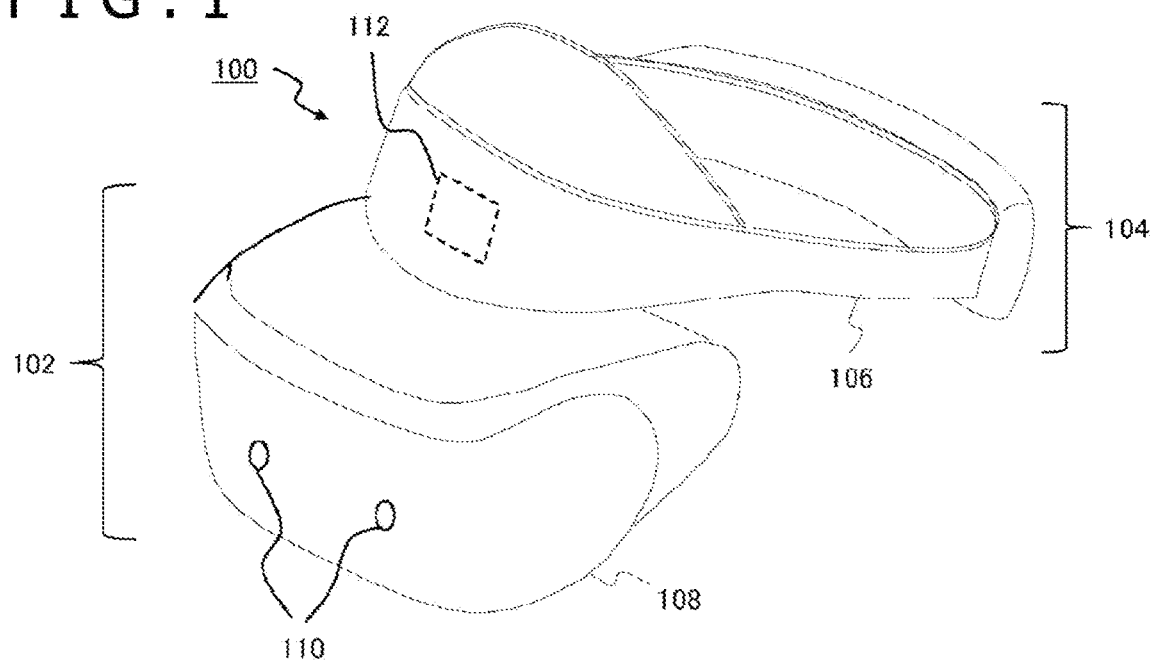
FIG. 1 is a view depicting an example of an appearance of a head-mounted display of an embodiment.

FIG. 1 depicts an example of an appearance of a head-mounted display 100. In this example, the head-mounted display 100 includes an output mechanism unit 102 and a mounting mechanism unit 104. The mounting mechanism unit 104 includes a mounting band 106 that extends, when the head-mounted display 100 is worn by a user, around the head of the user to implement device fixation. The output mechanism unit 102 includes a housing 108 of such a shape that it covers, in a state in which the user wears the head-mounted display 100, the left and right eyes of the user, and includes a display panel in the housing 108 such that it faces the left and right eyes of the user.

In the inside of the housing 108, eyepieces are further provided which are positioned, when the head-mounted display 100 is worn, between the display panel and the eyes of the user such that an image is viewed in an enlarged state. The head-mounted display 100 may further include speakers or earphones at positions corresponding to the ears of the user when the head-mounted display 100 is worn. Further, the head-mounted display 100 has built therein motion sensors such as an acceleration sensor, a gyro sensor, a geomagnetic sensor, and so forth and measures a posture and a movement of the head of the user by whom the head-mounted display 100 is worn.

The head-mounted display 100 further includes a stereo camera 110 on a front face of the housing 108 and captures a moving image of a real space therearound in a field of view corresponding to the direction of the face of the user. In one mode, the head-mounted display 100 provides a see-through mode in which it allows an appearance of a real space in a direction to which the user is directed to be viewed as it is by immediately displaying a moving image captured by the stereo camera 110. The head-mounted display 100 may further acquire a position or a posture of the head of the user by analyzing the image captured by the stereo camera 110.

The information of the position and the posture of the user head acquired from a measurement value of the motion sensors and a captured image can be used to determine a field of view of an image to be displayed on the head-mounted display 100 or determine contents of a change in a display world. The head-mounted display 100 of the present embodiment further includes a vibration generation device 112 provided at a position at which it contacts with the head of the user such that it transmits vibration to the user. Consequently, the head-mounted display 100 presents vibration according to contents being displayed to the user.

For example, when the user is fighting with an enemy character in a virtual world, vibration representative of an impact when the user attacks or is attacked is transmitted from the vibration generation device 112 to the user. By introducing the vibration generation device 112, it is possible to allow the user to feel a virtual world not only by a sense of sight and a sense of hearing but also by a sense of touch, and realistic sensations can be enhanced further. As the vibration generation device 112, any of general vibrators used in electronic equipment such as a flat eccentric vibration motor, a plumbous zirconate titanate (PZT) vibrator, and a voice coil motor (VCM) may be used. The deployment and the number of such vibration generation devices 112 are not restrictive.

Figure 2:
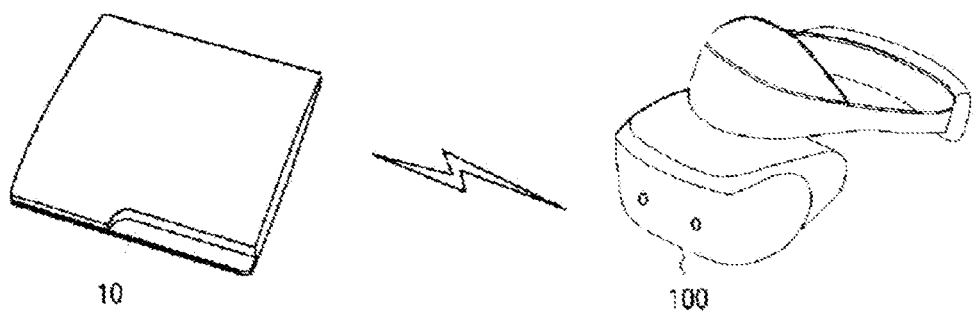
FIG. 2 is a view depicting an example of a configuration of a content processing system to which the present embodiment can be applied.

FIG. 2 depicts an example of a configuration of a content processing system to which the present embodiment can be applied. The head-mounted display 100 is connected to a content processing device 10 by wireless communication or by an interface that connects peripheral equipment of the universal serial bus (USB) Type-C or the like. The content processing device 10 may be connected further to a server through a network. In this case, the server may provide, to the content processing device 10, an on-line application of a game or the like in which a plurality of users can participate through the network.

The content processing device 10 basically processes content, generates data of a display image, output sound, and vibration and transmits the data to the head-mounted display 100. The head-mounted display 100 receives and outputs the data as an image, sound, and vibration of the content. At this time, the content processing device 10 acquires the information of the position and the posture of the head-mounted display 100 at a predetermined rate from the head-mounted display 100, specifies the position of the point of view of the user and the direction of the line of sight of the user on the basis of the acquired information, and generates and transmits a display image in a corresponding field of view. It is to be noted that the functions of the content processing device 10 may partly or entirely incorporated in the head-mounted display 100.

Figure 3:
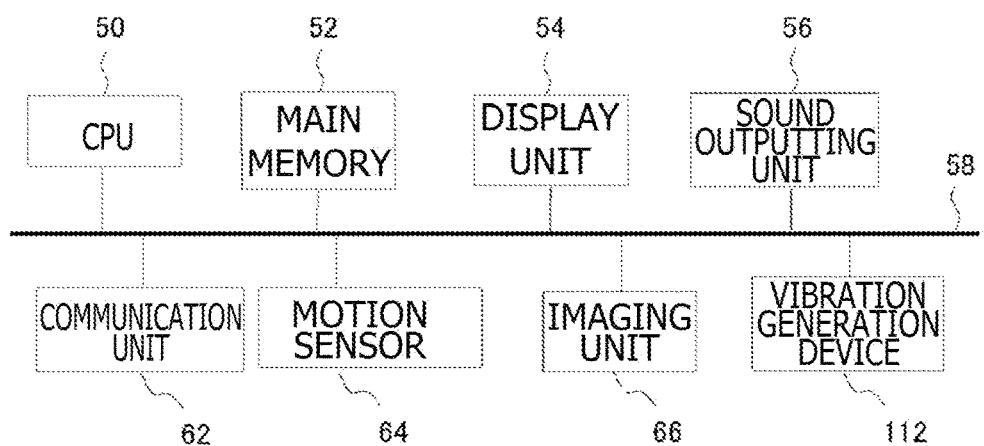
FIG. 3 is a view depicting a configuration of an internal circuit of the head-mounted display in the present embodiment.

FIG. 3 depicts a configuration of an internal circuit of the head-mounted display 100. The head-mounted display 100 includes a central processing unit (CPU) 50, a main memory 52, a display unit 54, a sound outputting unit 56, a communication unit 62, a motion sensor 64, an imaging unit 66, and the vibration generation device 112. Each part is connected to each other through a bus 58. The CPU 50 processes information acquired from each part of the head-mounted display 100 through the bus 58 and supplies output data to the display unit 54, the sound outputting unit 56, and the vibration generation device 112 through the bus 58.

The main memory 52 stores programs and data necessary for processing by the CPU 50. However, depending upon the design of an application to be executed or a device, the content processing device 10 sometimes performs almost all processes while it is sufficient for the head-mounted display 100 to merely output data transmitted from the content processing device 10. In this case, the CPU 50 or the main memory 52 can be replaced by a simpler device.

The display unit 54 includes a display panel such as a liquid crystal panel or an organic electroluminescent (EL) panel and a control mechanism for the display panel and displays an image in front of the eyes of the user who wears the head-mounted display 100. A stereoscopic image may be implemented by displaying a pair of parallax images in regions corresponding to the left and right eyes. The sound outputting unit 56 includes speakers or earphones provided at positions corresponding to the ears of the user and control mechanisms for the speakers or earphones when the user wears the head-mounted display 100, and outputs sound so as to be heard by the user.

The communication unit 62 establishes communication with the content processing device 10, a server not depicted or the like and transmits and receives necessary data. The motion sensor 64 includes at least one of an acceleration sensor, a gyro sensor, and a geomagnetic sensor, and measures a posture and a movement of the head-mounted display 100 in a three-dimensional space. The imaging unit 66 includes the stereo camera 110, and images an actual space at a predetermined rate and then performs a correction process suitably to form a captured image and outputs the captured image. The vibration generation device 112 generates vibration with contents corresponding to display contents as described hereinabove.

Figure 4:
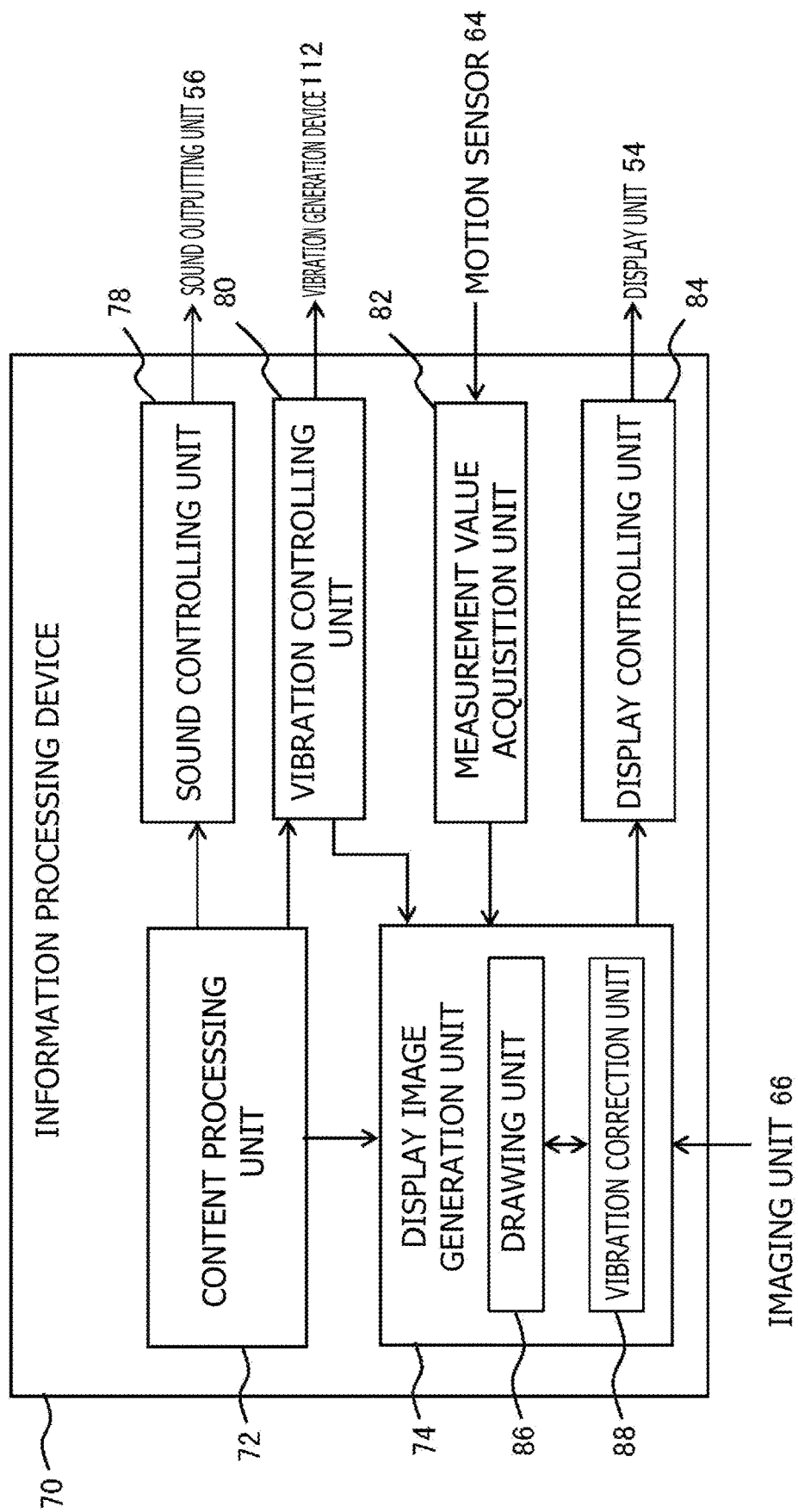
FIG. 4 is a view depicting an example of functional blocks of an information processing device that is built in the head-mounted display in the present embodiment.

FIG. 4 depicts a configuration of functional blocks of an information processing device 70 built in the head-mounted display 100. The functional blocks depicted in FIG. 4 can be implemented, in hardware, by the CPU 50 and the main memory 52 depicted in FIG. 3 and control circuits for each of the mechanisms and so forth, and can be implemented, in software, by a program that is loaded from a recording medium or the like into the main memory 52 and demonstrates various functions such as a data inputting function, a data retaining function, an image processing function, and a communication function. Accordingly, it can be recognized by those skilled in the art that the functional blocks can be implemented only by hardware, only by software, or a combination of them, and this is not restrictive.

The information processing device 70 includes a content processing unit 72 that processes content, a display image generation unit 74 that generates a display image as a result of processing, a sound controlling unit 78 that controls sound outputting, a vibration controlling unit 80 that controls vibration, a measurement value acquisition unit 82 that acquires a measurement value by the motion sensor 64, and a display controlling unit 84 that controls outputting of a display image. The content processing unit 72 processes content selected by the user through an inputting device not depicted or the like. The type of the content to be processed here is not restricted specifically.

For example, the content processing unit 72 progresses a game in response to a user operation and decodes and decompresses a panorama video. Then, the content processing unit 72 requests the display image generation unit 74 to generate an image frame to be outputted as a result of processing and requests the sound controlling unit 78 to output corresponding sound. Further, the content processing unit 72 requests the vibration controlling unit 80 to control the vibration generation device 112 to generate vibration according to contents of the display image.

The sound controlling unit 78 outputs, within a period according to a request from the content processing unit 72, sound data of contents according to the request to the sound outputting unit 56. For example, the sound controlling unit 78 reproduces environment sound and sound effects of an image world to be displayed, voice or the like of a character to appear or a person to appear. The vibration controlling unit 80 controls, within a period according to the request from the content processing unit 72, the vibration generation device 112 to generate vibration with contents according to the request. As described hereinabove, the vibration controlling unit 80 causes vibration conforming to a battle situation with an enemy character to be generated. However, in regard to contents that can provide realistic sensations or entertainment through a tactile stimulus, the generation timing of vibration and the way of causing vibration are not restricted specifically.

The measurement value acquisition unit 82 acquires a measurement value of at least one of a posture, an acceleration, an angular acceleration, and so forth at a predetermined rate from the motion sensor 64 built in the head-mounted display 100. The display image generation unit 74 generates an image frame for being displayed on the head-mounted display 100 at a predetermined rate in accordance with a request from the content processing unit 72. In particular, the display image generation unit 74 includes a drawing unit 86 that draws a display image in a field of view based on the measurement value of the motion sensor 64, and a vibration correction unit 88 that corrects the measurement value in response to vibration of the vibration generation device 112.

The drawing unit 86 calculates a posture of the head-mounted display 100 and hence of the user head on the basis of the measurement value of the motion sensor 64, and draws a display image in a field of view corresponding to the posture of the user head. Thus, it is possible to cause an image world, in which the user is directed, to be viewed and thereby to provide realistic sensations. The drawing unit 86 may further analyze a captured image outputted from the imaging unit 66 to complement posture information or acquire position information of the user head and reflect the posture information on the field of view. Further, the captured image may be utilized as part of the display image.

Anyway, during a period during which vibration is generated by the vibration generation device 112, the possibility is high that the motion sensor 64 may measure a fine movement of the head-mounted display 100 caused by the vibration in addition to the posture and the movement of the user head. It is considered that, if a field of view for a display image is determined on the basis of a measurement value that includes such vibration components, then the image may sway irrespective of the movement of the head, which gives an uncomfortable feeling to the user or, in some cases, causes the user to have poor physical conditions by visually induced motion sickness. Therefore, the vibration correction unit 88 corrects the measurement value in response to the vibration within a period within which the vibration generation device 112 is caused to vibrate.

The vibration correction unit 88 uses, for example, a band-pass filter to remove frequency components of vibration provided from the vibration generation device 112 from the waveform of the measurement value of the motion sensor 64. Alternatively, the vibration correction unit 88 uses a long tap smoothing filter to perform a smoothing process for the waveform of the measurement value of the motion sensor 64. This process is effective especially for vibration of somewhat high frequencies. Otherwise, the vibration correction unit 88 applies an acceleration in the opposite direction to that of an acceleration of the vibration provided to the vibration generation device 112 to the waveform of the measurement value of the motion sensor 64.

In a case where the vibration generation device 112 is a voice coil motor, since the movement of an internal magnet is controlled by an application voltage, the acceleration and the waveform of the vibration turn out clearly by themselves. The vibration correction unit 88 acquires information of contents of vibration to be actually provided to the vibration generation device 112, namely, of a vibration frequency, an acceleration of the vibration, a vibration period, and so forth, from the vibration controlling unit 80 and corrects the measurement value of the motion sensor 64 such that it corresponds to the information. The drawing unit 86 determines a field of view using the corrected measurement value and draws an image of the field of view, and thus, the influence of the vibration on the display image can be suppressed.

The display controlling unit 84 outputs data of a display image generated by the display image generation unit 74 to the display unit 54 such that the display image is displayed on the display panel. It is to be noted that at least part of the functions of the information processing device 70 depicted may be provided in the content processing device 10. In this case, it will be recognized by those skilled in the art that transfer of data is performed as needed by communication between them.

Figure 5:
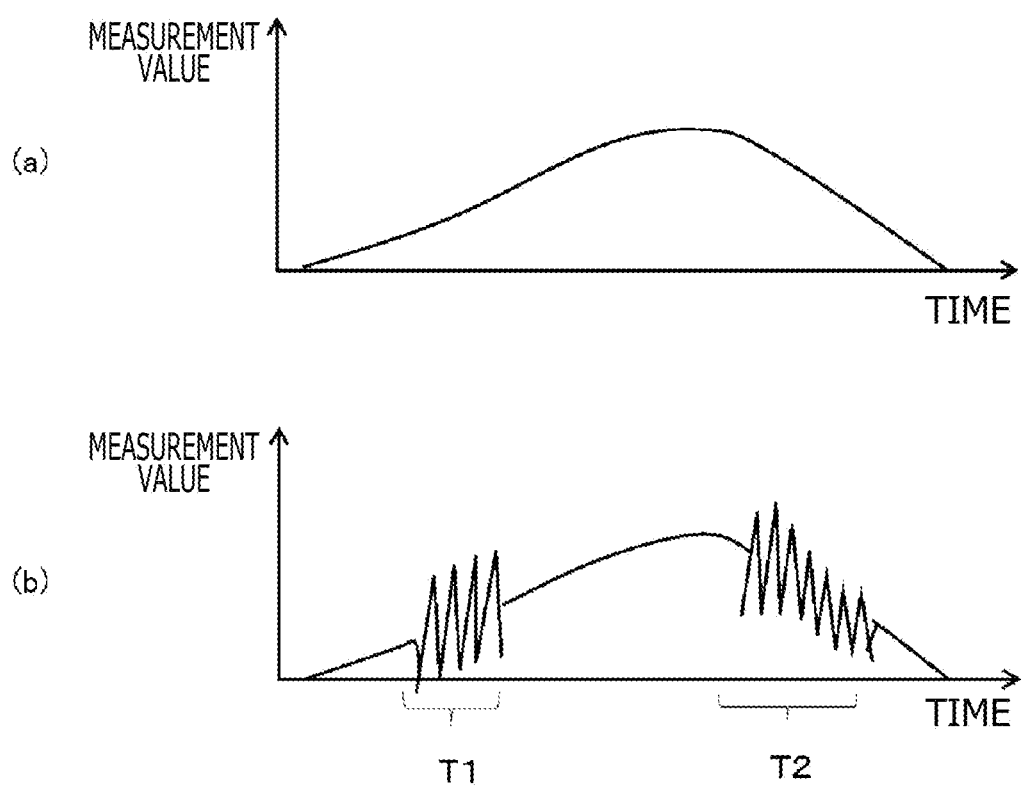
FIG. 5 illustrates views exemplifying a time variation of a measurement value of a motion sensor acquired by a measurement value acquisition unit in the present embodiment.

FIG. 5 exemplifies a time variation of the measurement value of the motion sensor 64 that is acquired by the measurement value acquisition unit 82. Here, the measurement value is of a posture, an acceleration, an angular acceleration, or the like of the head-mounted display 100, and although it is actually three-dimensional information, a one-dimensional value of the information is depicted here in FIG. 5. For example, if an angular acceleration is considered, then when the user changes the direction of its face, such a waveform as depicted in (a) of FIG. 5 is obtained which monotonously increases in the front half and monotonously decreases in the latter half. By integrating the waveform, the direction of the face at a given timing can be calculated.

On the other hand, in a case where the vibration generation device 112 is caused to vibrate during periods T1 and T2 from within a period within which the user is changing the direction of the face, it can be considered that the vibration is included in a result of the measurement as depicted in (b) of FIG. 5, and the resulting waveform becomes different from the original waveform that represents the movement of the head. Such a change as just described can appear without depending upon the type of the measurement value or upon whether or not the user is moving the head.

FIG. 6 schematically depicts a change of a display image that can be caused by vibration of the vibration generation device 112. The drawing unit 86 calculates a position and a posture of the head in a cycle in which a display image is generated on the basis of such a measurement value as depicted in FIG. 5, and draws a display image in the corresponding field of view. If there is no influence of the vibration on the measurement value as depicted in (a) of FIG. 5, then an image in which a picture of an object moves in the screen image in response to the movement of the user head is displayed as depicted in (a) of FIG. 6. In (a) of FIG. 6, it is indicated by an arrow mark that, under the assumption that the object itself does not move, the picture of the object moves in the leftward direction in the screen image by turning of the user to the rightward direction.

If the user does not move, then naturally, the picture of the object stops. On the other hand, if vibration components of the vibration generation device 112 are included in the measurement value of the motion sensor 64 as indicated by the periods T1 and T2 of (b) of FIG. 5, then the field of view is fluctuated so as to reflect the vibration components. As a result, the picture of the object suffers from image blur that is different from the movement of the head as depicted in (b) of FIG. 6. The blur varies depending upon the manner of vibration by the vibration generation device 112 and the drawing cycle of the display image.

Therefore, the vibration correction unit 88 carries out correction of reducing or removing vibration components that appear in the measurement value of the motion sensor 64 within the periods T1 and T2 within which the vibration generation device 112 is vibrating. Consequently, the vibration correction unit 88 corrects the measurement value of the motion sensor 64 so as to come near to that in the state of (a) of FIG. 5 from that in the state of (b) of FIG. 5. In particular, the vibration correction unit 88 removes frequency components of vibration by a band-pass filter as described hereinabove. Alternatively, the vibration correction unit 88 smoothes the time variation of the measurement value by a smoothing filter. To such processes as just described, a technology that is used in noise removal from a general signal can be applied.

FIG. 7 is a view illustrating an example of a technique for correcting the measurement value of the motion sensor 64 by the vibration correction unit 88. Here, it is assumed that the vibration generation device 112 is a voice coil motor that can control the movement of the internal magnet thereof with an application voltage. In this case, a waveform 122a of the measurement value of the acceleration of the motion sensor 64, which arises from vibration of the vibration generation device 112, is turned out in advance. Accordingly, the vibration correction unit 88 cancels the influence of vibration by adding an acceleration 122b in a reverse direction (reverse phase) to the actual measurement value.

Although FIG. 7 depicts only one time of movement of the magnet, this is similarly applied even where a plurality of times of movement are involved, namely, even where accelerations in the opposite directions are involved. Note that this does not signify that the waveform of the acceleration by vibration is restricted to that depicted in FIG. 7. Further, if the waveform of the measurement value caused by vibration is determined in advance by an experiment, then even in regard to a measurement value other than the acceleration, the influence can be cancelled by a similar principle by adding a waveform of the reverse phase.

The vibration correction unit 88 retains therein a table that associates information for identifying contents of vibration that is capable of being provided to the vibration generation device 112 by the vibration controlling unit 80 and waveforms of the reverse phase to be added to the measurement value of the motion sensor 64 with each other. Then, by acquiring contents of actual vibration from the vibration controlling unit 80, the vibration correction unit 88 selects a waveform of the reverse phase corresponding to the actual vibration and adds the waveform to the measurement value to correct the measurement value.

Figure 8:
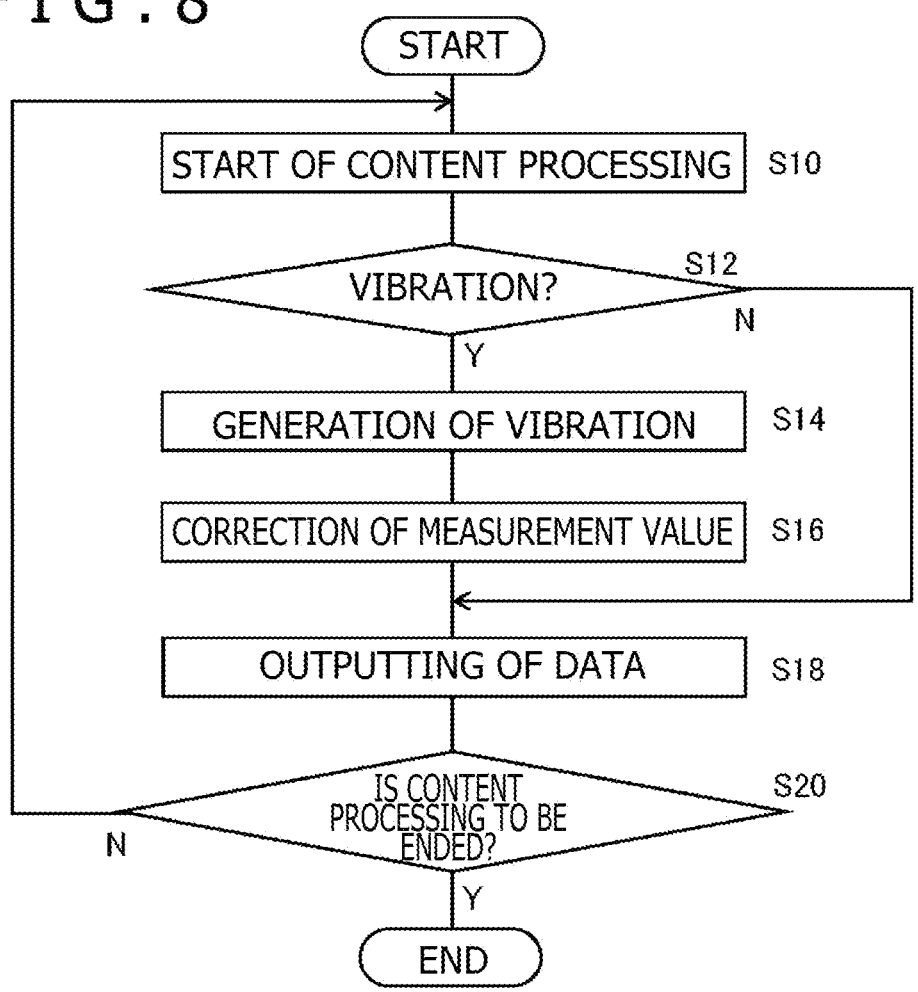
FIG. 8 is a flow chart depicting a processing procedure when the information processing device in the present embodiment performs data outputting to a head-mounted display that has a vibration function.

Now, operation of the information processing device that can be implemented by the configuration described above is described. FIG. 8 is a flow chart depicting a processing procedure when the information processing device 70 performs data outputting to the head-mounted display 100 that has the vibration function. This flow chart is started when the user wears the head-mounted display 100 and performs an operation for selecting a desired content or the like. First, the content processing unit 72 of the information processing device 70 starts processing of the selected content (S10).

At this time, if there is no necessity to cause the vibration generation device 112 to vibrate (N at S12), then the drawing unit 86 of the display image generation unit 74 acquires the position and the posture of the user head at least on the basis of the measurement value of the motion sensor 64, generates a display image in a corresponding field of view, and outputs data to the display unit 54 through the display controlling unit 84 (S18). At this time, if there is the necessity to output also sound, the sound controlling unit 78 outputs the data to the sound outputting unit 56. In a case where there is the necessity to cause the vibration generation device 112 to vibrate (Y at S12), the vibration controlling unit 80 controls the vibration generation device 112 to vibrate with contents requested from the content processing unit 72 (S14).

On the other hand, the vibration correction unit 88 of the display image generation unit 74 carries out correction for removing or reducing the vibration components from the measurement value of the motion sensor 64 (S16). Then, the drawing unit 86 generates a display image in a field of view based on the corrected measurement value and outputs data to the display unit 54 through the display controlling unit 84 (S18). If there is the necessity to output also sound, the sound controlling unit 78 outputs the data to the sound outputting unit 56. During a period during which there is no necessity to end the processing, the processes at S10 to S16 are repeated (N at S20). If the necessity to end the processing arises from that the content itself comes to an end or the user inputs an ending request, the content processing unit 72 ends all the processes (Y at S20).

Figure 9:
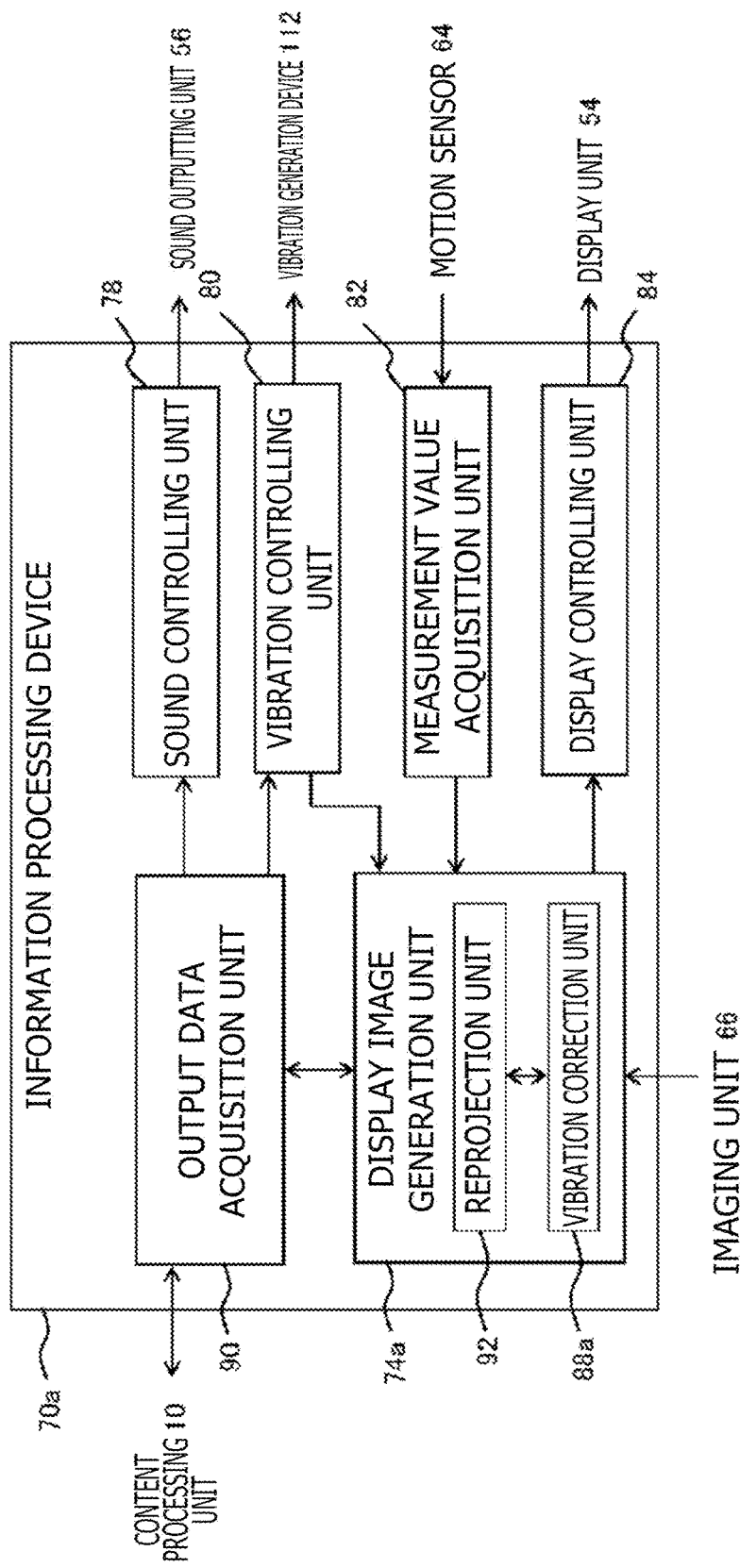
FIG. 9 is a view depicting a configuration of functional blocks of an information processing device in a mode in which a measurement value of the motion sensor to be used for correction of an image frame acquired from the outside is corrected in the present embodiment.

Although, in the mode having been described so far, the measurement value is corrected in order to determine a field of view at the time of drawing of a display image, similar correction can be applied also in a mode in which a display image generated once is corrected in response to the most recent position or posture of the head. FIG. 9 depicts a configuration of functional blocks of an information processing device of a mode in which the measurement value of the motion sensor 64 to be used for correction of an image frame acquired from the outside is corrected. It is to be noted that functions same as those of the information processing device 70 depicted in FIG. 3 are denoted by the same reference signs and description of them is omitted.

The information processing device 70a not only includes the sound controlling unit 78, the vibration controlling unit 80, the measurement value acquisition unit 82 and, the display controlling unit 84 described hereinabove with reference to FIG. 3 but also includes an output data acquisition unit 90 that acquires output data transmitted from the content processing device 10 and a display image generation unit 74a that corrects the image transmitted thereto to generate a display image. The output data acquisition unit 90 sequentially acquires data of an image frame transferred from the content processing device 10 and acquires data for output sound and vibration at a necessary timing. It is to be noted that the output data acquisition unit 90 may acquire such data from a content distribution server or the like through a network.

The output data acquisition unit 90 supplies data of output sound and vibration suitably to the sound controlling unit 78 and the vibration controlling unit 80 such that they are outputted from the sound outputting unit 56 and the vibration generation device 112. The display image generation unit 74a acquires data of an image frame transmitted thereto and corrects the data to generate a final display image. For example, even if the display image generation unit 74a transmits information relating to the position and the posture of the user head to the content processing device 10 and receives an image frame generated in a corresponding field of view from the content processing device 10, the position and the posture that have changed during the data transmission and reception period are not reflected on the image.

As a result, it is considered that some delay that cannot be ignored appears on the display image in regard to the movement of the head, resulting in impairing a sense of immersion or causing visually induced motion sickness thereby to deteriorate the quality of the user experience. Therefore, the display image generation unit 74a performs correction for causing the position and the posture of the head immediately before the displaying to be reflected on an image transmitted thereto from the content processing device 10 (such correction is hereinafter referred to as reprojection) such that an image having less delay is displayed. In particular, the display image generation unit 74a includes a reprojection unit 92 and a vibration correction unit 88a.

The reprojection unit 92 performs reprojection of correcting an image frame transmitted thereto from the content processing device 10 on the basis of the latest measurement value of the motion sensor 64 as described above. In particular, the reprojection unit 92 generates a display image in the latest field of view by correction of a picture according to the difference between the position and the posture of the user head and the position and the posture at a point of time at which the reprojection unit 92 performs its processing, as supposed when the content processing device 10 generates an image. Most simply, the reprojection unit 92 moves the image in the reverse direction by the difference in movement of the head of the user. A more detailed process is disclosed, for example, in PCT Patent Publication No. WO2019/026765.

The position and the posture of the user head that are supposed when the content processing device 10 generates an image may be determined irrespective of an actual state of the user head or an actual state of the user head may be reflected on them as long as information can be shared between the information processing device 70a and the content processing device 10. In the latter case, the output data acquisition unit 90 acquires a measurement value of the motion sensor 64 and the measurement time acquired by the measurement value acquisition unit 82 from the display image generation unit 74a and transmits them to the content processing device 10. Further, the output data acquisition unit 90 acquires, from the content processing device 10, the measurement time together with an image frame generated on the basis of the measurement value. Consequently, the reprojection unit 92 can calculate the difference in measurement value and, as a result, the difference in position and posture of the user head.

The vibration correction unit 88a corrects the measurement value of the motion sensor 64, which is to be used by the reprojection unit 92 to perform reprojection, within a period during which the vibration generation device 112 is caused to vibrate. The correction method may be similar to that of the mode described above. Consequently, it can be avoided that the influence of vibration of the vibration generation device 112 appears on an image after the reprojection. It is to be noted that, in a case where the measurement value of the motion sensor 64 is transmitted to the content processing device 10, during a period during which the vibration generation device 112 is caused to vibrate, the measurement value after correction by the vibration correction unit 88a may be used as a transmission target.

According to the embodiment described above, a vibration generation device is provided on a head-mounted display such that it generates vibration corresponding to display contents. Consequently, the user can feel an image world not only by a sense of sight and a sense of hearing but also by a sense of touch. Here, during a period during which the vibration generation device is caused to vibrate, correction for removing an influence of vibration from the measurement value of the motion sensor on the basis of which the field of view of a display image is determined is performed. Consequently, such a situation can be prevented that a picture being displayed sways or vibrates irrespective of the movement of the head, which deteriorates realistic sensations or causes visually induced motion sickness. As a result, realistic sensations can be enhanced while the quality of the display image on the head-mounted display is maintained.

The present invention has been described on the basis of the embodiment. The embodiment described above is exemplary, and it will be recognized by those skilled in the art that various modifications are possible in combination of various components and various processes and that also such modifications fall within the scope of the present invention.

For example, although, in the present embodiment, the measurement value of the motion sensor 64 is corrected, the correction target is not limited to this. In particular, in addition to the measurement value of the motion sensor 64, any parameter that is acquired from a captured image of the stereo camera 110 and used for drawing or reprojection of a display image and varies by vibration of the vibration generation device 112 can become a correction target. In any case, the vibration correction unit can reduce the influence of vibration by a technique similar to that in the present embodiment.

INDUSTRIAL APPLICABILITY

As described above, the present invention can be utilized in various devices such as a wearable terminal such as a head-mounted display, a game device, a portable terminal, and an information processing device and a system that includes any one of them.

REFERENCE SIGNS LIST

10: Content processing device
50: CPU
52: Main memory
54: Display unit
56: Sound outputting unit
60: Input/output interface
62: Communication unit
64: Motion sensor
66: Imaging unit
70: Information processing device
72: Content processing unit
74: Display image generation unit
78: Sound controlling unit
80: Vibration controlling unit
82: Measurement value acquisition unit
84: Display controlling unit
86: Drawing unit
88: Vibration correction unit
90: Output data acquisition unit
92: Reprojection unit
100: Head-mounted display
110: Stereo camera
112: Vibration generation device.

The invention claimed is:

1. An information processing device comprising:
processing circuitry configured to
acquire a measurement value by a motion sensor that is built in a head-mounted display;
generate a display image in a field of view based on the measurement value;
cause data of the display image to be displayed on a display panel;
cause a vibration motor built in the head-mounted display to vibrate so as to correspond to contents of the display image; and
correct the measurement value in response to the vibration during a period during which the vibration motor is caused to vibrate and then determines the field of view, wherein the processing circuitry for correcting the measurement value is further configured to
remove a frequency component of vibration provided to the vibration motor from a waveform of the measurement value during a period during which the vibration motor is caused to vibrate.

2. The information processing device according to claim 1, wherein the processing circuitry is further configured to correct an image transferred thereto from an external apparatus based on the measurement value to generate a display image in a latest field of view and corrects the measurement value during a period during which the vibration motor is caused to vibrate.

3. The information processing device according to claim 1, wherein the processing circuitry is further configured to carry out a smoothing process for a waveform of the measurement value during a period during which the vibration motor is caused to vibrate.

4. The information processing device according to claim 1, wherein the processing circuitry is further configured to add a waveform of a reverse phase to that of a waveform of the measurement value generated by vibration of the vibration motor to the waveform of the measurement value during a period during which the vibration motor is caused to vibrate.

5. The information processing device according to claim 4, wherein the processing circuitry is further configured to retain a table that associates information for identifying contents of vibration that is capable of being provided to the vibration motor waveforms of the reverse phase with each other, and select a waveform to be added to the waveform of the measurement value during a period during which the vibration motor is caused to vibrate according to actual contents of the vibration.

6. The information processing device according to claim 2, wherein the processing circuitry is further configured to reproject the display image in the latest field of view by correction of a picture according to a difference between a position and a posture of a user head and a position and a posture at a point of time at which the display image is generated.

7. A head-mounted display comprising:
an information processing device including processing circuitry configured to
acquire a measurement value by a motion sensor that is built in the head-mounted display,
generate a display image in a field of view based on the measurement value,
cause data of the display image to be displayed on a display panel, and
cause a vibration motor built in the head-mounted display to vibrate so as to correspond to contents of the display image,
correct the measurement value in response to the vibration during a period during which the vibration motor is caused to vibrate and then determines the field of view, wherein the processing circuitry for correcting the measurement value is further configured to
remove a frequency component of vibration provided to the vibration motor from a waveform of the measurement value during a period during which the vibration motor is caused to vibrate; and
the motion sensor, the display panel, and the vibration motor.

8. An image displaying method comprising:
acquiring a measurement value by a motion sensor that is built in a head-mounted display;
generating a display image in a field of view based on the measurement value;
causing data of the display image to be displayed on a display panel;
causing a vibration motor built in the head-mounted display to vibrate so as to correspond to contents of the display image; and
correcting the measurement value in response to the vibration during a period during which the vibration motor is caused to vibrate and then determines the field of view, wherein correcting the measurement value includes
removing a frequency component of vibration provided to the vibration motor from a waveform of the measurement value during a period during which the vibration motor is caused to vibrate.

9. The method of claim 8, further comprising:
correcting an image transferred thereto from an external apparatus based on the measurement value to generate a display image in a latest field of view and corrects the measurement value during a period during which the vibration motor is caused to vibrate.

10. The method of claim 8, further comprising:
carrying out a smoothing process for a waveform of the measurement value during a period during which the vibration motor is caused to vibrate.

11. The method of claim 8, further comprising:
adding a waveform of a reverse phase to that of a waveform of the measurement value generated by vibration of the vibration motor to the waveform of the measurement value during a period during which the vibration motor is caused to vibrate.

12. The method of claim 11, further comprising:
retaining a table that associates information for identifying contents of vibration that is capable of being provided to the vibration motor and waveforms of the reverse phase with each other, and select a waveform to be added to the waveform of the measurement value during a period during which the vibration motor is caused to vibrate according to actual contents of the vibration.

13. The method of claim 9, further comprising:
reprojecting the display image in the latest field of view by correction of a picture according to a difference between a position and a posture of a user head and a position and a posture at a point of time at which the display image is generated.

14. A non-transitory computer-readable storage medium storing computer-readable instructions thereon which, when executed by a computer, cause the computer to perform a method, the method comprising:
acquiring a measurement value by a motion sensor that is built in a head-mounted display;
generating a display image in a field of view based on the measurement value;
causing data of the display image to be displayed on a display panel;
causing a vibration motor built in the head-mounted display to vibrate so as to correspond to contents of the display image; and
correcting the measurement value in response to the vibration during a period during which the vibration motor is caused to vibrate and then determines the field of view, wherein correcting the measurement value includes
removing a frequency component of vibration provided to the vibration motor from a waveform of the measurement value during a period during which the vibration motor is caused to vibrate.

* * * * *